(12) United States Patent
Hara

(10) Patent No.: US 6,477,385 B1
(45) Date of Patent: Nov. 5, 2002

(54) MOBILE COMMUNICATION SYSTEM AND METHOD FOR ESTABLISHING SYNCHRONIZATION IN MOBILE COMMUNICATIONS

(75) Inventor: Yutaka Hara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/361,223

(22) Filed: Jul. 27, 1999

(30) Foreign Application Priority Data

Jul. 27, 1998 (JP) .......................................... 10-225206

(51) Int. Cl.$^7$ .............................................. H04B 7/005
(52) U.S. Cl. ...................... 455/502; 455/500; 455/422; 370/503; 370/350
(58) Field of Search ................................ 455/422, 500, 455/502, 503, 561, 560, 507, 462; 375/354, 356, 358, 359, 362, 365; 370/503, 340, 350, 280

(56) References Cited

U.S. PATENT DOCUMENTS

| | | | | |
|---|---|---|---|---|
| 4,665,404 A | * | 5/1987 | Christy et al. | 342/463 |
| 5,347,562 A | * | 9/1994 | Candy | 370/280 |
| 5,363,376 A | * | 11/1994 | Chuang et al. | 370/503 |
| 5,404,575 A | * | 4/1995 | Lehto | 455/502 |
| 5,608,765 A | * | 3/1997 | Tanoue | 375/365 |
| 5,666,366 A | * | 9/1997 | Malek et al. | 370/505 |
| 5,722,080 A | * | 2/1998 | Kondo | 455/502 |
| 5,898,929 A | * | 4/1999 | Haartsen | 455/462 |
| 5,978,369 A | * | 11/1999 | Silvestre et al. | 370/350 |
| 6,112,100 A | * | 8/2000 | Ossoinig et al. | 455/502 |
| 6,119,015 A | * | 9/2000 | Eun | 455/502 |
| 6,119,016 A | * | 9/2000 | Matusevich | 455/502 |
| 6,226,518 B1 | * | 5/2001 | An | 455/449 |
| 6,243,585 B1 | * | 6/2001 | Pelech et al. | 455/449 |

FOREIGN PATENT DOCUMENTS

JP            7-131853            5/1995

* cited by examiner

*Primary Examiner*—Dwayne Bost
*Assistant Examiner*—Joy K. Contee
(74) *Attorney, Agent, or Firm*—Sughrue Mion, PLLC

(57) ABSTRACT

In a mobile communication system comprising: a plurality of first base stations each having a predetermined radio zone, for performing communication with one or more mobile stations; a plurality of second base stations each having a predetermined radio zone and each having a predetermined synchronous area, for performing communication with one or more mobile stations and, in addition, giving a synchronous standard to the plurality of first base stations with the radio zones being in contact with or overlapped with each other within the synchronous area; and an absolute synchronous station for giving a synchronous standard to each of the plurality of second base stations, the second base stations each control the timing of a control channel signal transmitted to the other second base stations based on the timing of a control channel signal transmitted by the absolute synchronous station. The above constitution can realize a mobile communication system and a method for establishing synchronization that can ensure synchronization between a plurality of base stations and can enhance frequency reuse in time division transmission without increasing the occurrence of interference.

25 Claims, 7 Drawing Sheets

MOBILE COMMUNICATION SYSTEM AND METHOD FOR ESTABLISHING SYNCHRONIZATION IN MOBILE COMMUNICATIONS

FIELD OF THE INVENTION

The invention relates to a mobile communication system suitable for use, for example, in digital cellular phones and mobile communications of small-zone time division multiaccess, and a method for establishing synchronization in mobile communications.

BACKGROUND OF THE INVENTION

In TDD (time division duplex)-TDMA (time division multiple access) mobile communications, such as PHS (personal handy-phone system), timing of transmission/receiving should be adjusted between a plurality of base stations installed within the service area to prevent the occurrence of interference.

Means, which has hitherto been used, for coping with this demand is such that the standard is set so as to be consistent with that of other device with which the base station is in synchronization, alternatively such that all the base stations are brought to synchronization with one standard station.

When the standard is set so as to be consistent with that of other device with which the base station is in synchronization, however, the management of these devices is likely to be influenced by other devices. Further, in areas where any standard device is absent, it is impossible to provide synchronization between base stations.

On the other hand, when all the base stations are brought to synchronization with one standard system, a lot of time is disadvantageously taken for achieving synchronization in the whole service area.

SUMMARY OF THE INVENTION

The invention has been made under these circumstances, and it is an object of the invention to provide a mobile communication system and a method for establishing synchronization in mobile communications that can ensure synchronization between a plurality of base stations and can enhance frequency reuse in time division transmission without suffering from increased interference.

According to the first feature of the invention, a mobile communication system comprises:

a plurality of first base stations each having a predetermined radio zone, for performing communication with one or more mobile stations;

a plurality of second base stations each having a predetermined radio zone, for performing communication with one or more mobile stations and, in addition, giving a synchronous standard to said plurality of first base stations; and an absolute synchronous station for giving a synchronous standard to each of the plurality of second base stations.

In the mobile communication system, preferably, the plurality of second base stations each have a predetermined synchronous area and a plurality of the first base stations with the radio zones being in contact with or overlapped with each other are present within the synchronous area.

Preferably, the second base stations each have first timing control means for controlling the timing of a control channel signal transmitted to other second base station based on the timing of a control channel signal transmitted by the absolute synchronous station.

Preferably, the second base stations each have second timing control means for controlling the timing of a control channel signal transmitted to the mobile station based on the timing of a control channel signal transmitted by the absolute synchronous station.

Preferably, the second base stations each have second timing control means for controlling the timing of a control channel signal transmitted to the mobile station based on the timing of a control channel signal transmitted by the other second base stations.

Preferably, the control channel signal has a predetermined fixed code at a predetermined position of all bits, and the second base stations each delay the control channel signal to be transmitted so that the bit position of the predetermined fixed code contained in the control channel signal transmitted is consistent with the bit position of the predetermined fixed code contained in the received control channel signal.

According to the second feature of the invention, a method for establishing synchronization in mobile communication, comprises the steps of:

providing a mobile communication system comprising
a plurality of first base stations each having a predetermined radio zone, for performing communication with one or more mobile stations,
a plurality of second base stations each having a predetermined radio zone and each having a predetermined synchronous area, for performing communication with one or more mobile stations and, in addition, giving a synchronous standard to the plurality of first base stations with the radio zones being in contact with or overlapped with each other within the synchronous area, and
an absolute synchronous station for giving a synchronous standard to each of the plurality of second base stations; and
through each of the second base stations, controlling the timing of a control channel signal transmitted to the other second base stations based on the timing of a control channel signal transmitted by the absolute synchronous station.

In the method for establishing synchronization in mobile communication, preferably, the second base stations each control the timing of a control channel signal transmitted to the mobile station based on the timing of a control channel signal transmitted by the absolute synchronous station.

Preferably, the second base stations each control the timing of a control channel signal transmitted to the mobile station based on the timing of a control channel signal transmitted by the other second base stations.

Preferably, the control channel signal has a predetermined fixed code at a predetermined position of all bits, and the second base stations each delay the control channel signal to be transmitted so that the bit position of the predetermined fixed code contained in the control channel signal transmitted is consistent with the bit position of the predetermined fixed code contained in the received control channel signal.

BRIEF DESCRIPTION OF THE DRAWING

The invention will be explained in more detail in conjunction with the appended drawings, wherein.

DESCRIPTION OF THE PREFERRED EMBODIMENTS

The preferred embodiments of the invention will be explained in FIGS. 1 to 7.

Figure 1:
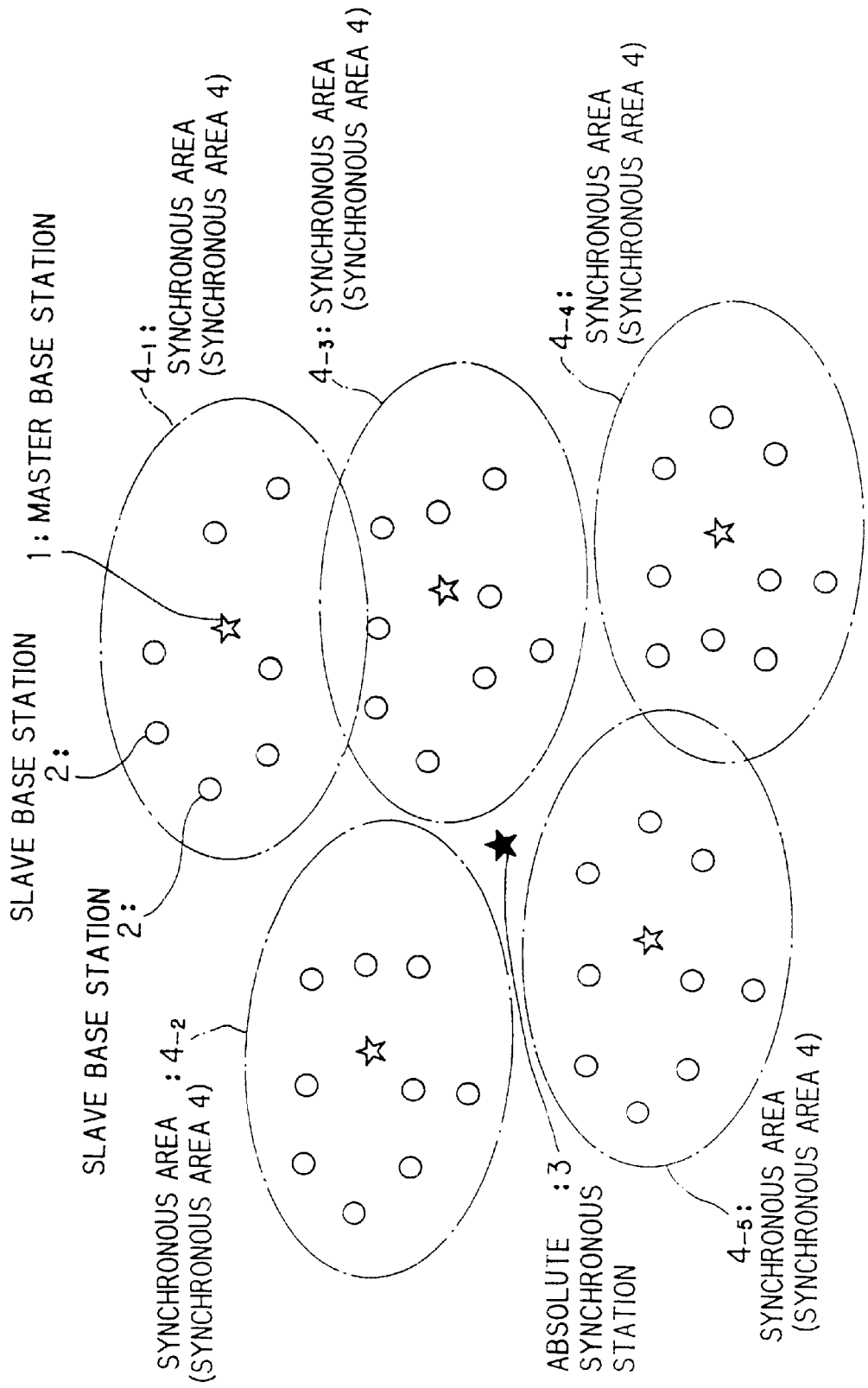
FIG. 1 is a diagram showing the whole construction of the mobile communication system according to one preferred embodiment of the invention.

FIG. 1 is a diagram showing the whole construction of the mobile communication system according to one preferred embodiment of the invention. In this case, the mobile communication system of the invention is applied to microcellular mobile communication systems, such as PHS's.

In FIG. 1, numeral 3 designates an absolute synchronous station that serves as a standard of the synchronization of synchronous areas $4_{-1}$, $4_{-2}$, $4_{-3}$ . . . (hereinafter often referred to simply as "synchronous area 4").

A master base station 1 and a plurality of slave base stations 2, 2. . . are present in each of the synchronous areas $4_{-1}$, $4_{-2}$, $4_{-3}$ . . . .

This master base station 1 is not used for call processing services and communication services but for establishment of synchronization of the slave base stations 2, 2·· · · On the other hand, the slave base station 2 is used in actual communication services.

Figure 2:
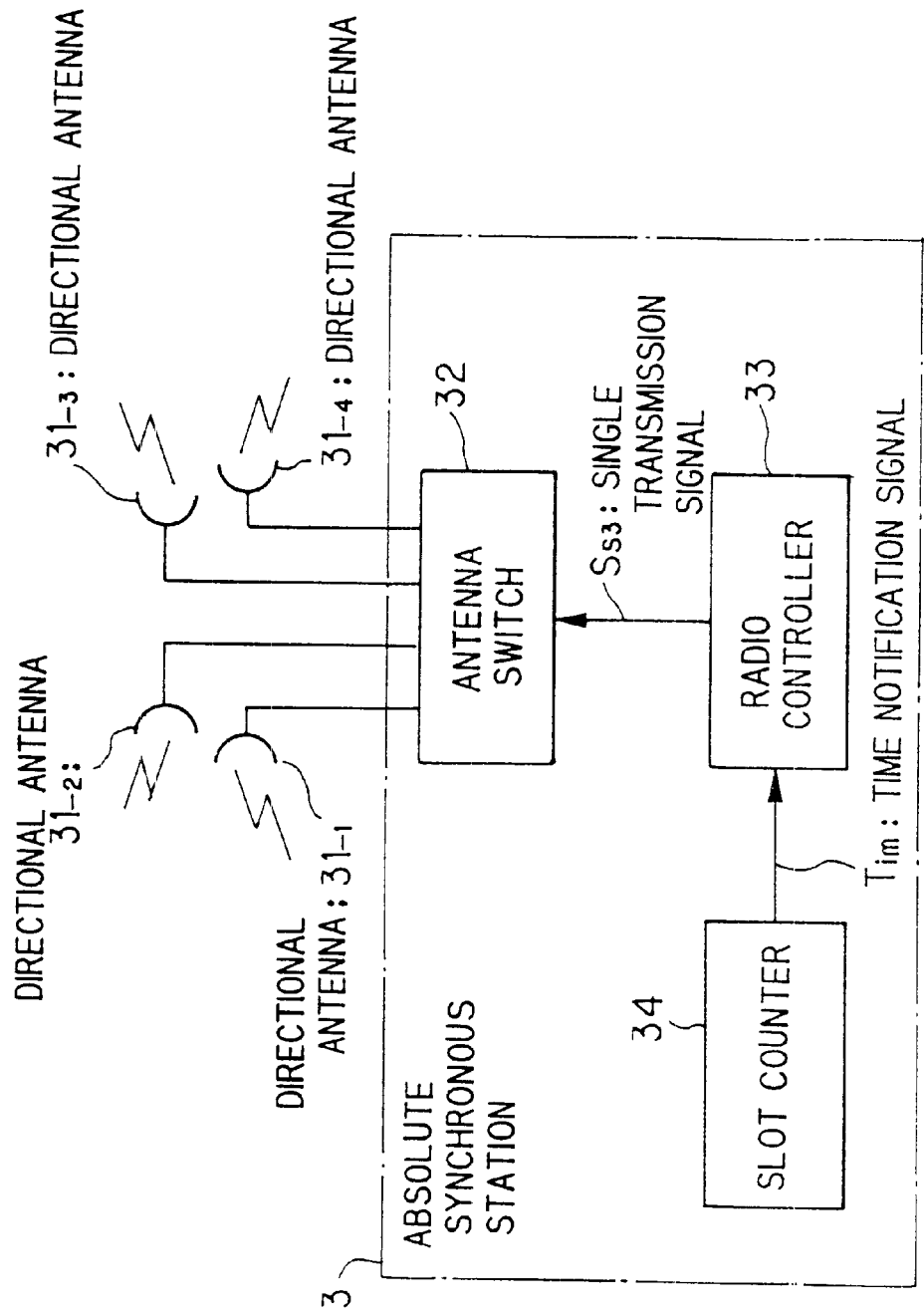
FIG. 2 is a detailed block diagram showing one example of the construction of an absolute synchronous station in the preferred embodiment of the invention.

The absolute synchronous station 3 is for synchronization in the preferred embodiment of the invention, and is not used in communication with mobile stations (not shown). FIG. 2 is a detailed block diagram showing one example of the construction of an absolute synchronous station 3.

As shown in FIG. 2, the absolute synchronous station 3 has, for example, four directional antennas $31_{-1}$ to $31_{-4}$. The directional antennas $31_{-1}$ to $31_{-4}$ are installed so that the main lobe faces a desired master base station 1.

The directional antennas $31_{-1}$ to $31_{-4}$ each predetermine a master base station 1 as the corresponding transmission destination to ensure the synchronous area 4 and, at the same time, prevents propagation delay attributable to multipath.

According to this preferred embodiment, the directional antennas $31_{-1}$ to $31_{-4}$ each, for example, have a gain of not less than 10 dBi, and transmit control channel signals with frequencies in commercial use at a power of 200 mW to the master base station 1.

Numeral 32 designates an antenna switch comprising a gate circuit. This antenna switch 32 functions to direct a transmission control channel signal to any one of the antennas $31_{-1}$ to $31_{-4}$ through a single transmission signal $S_{S3}$.

Numeral 33 designates a radio controller. The radio controller 33 selects and controls the directional antenna $31_{-1}$ to $31_{-1}$ for the antenna switch 32 based on a time notification signal $T_{im}$ sent from a slot counter 34 for counting the number of slots of TDMA.

Figure 3:
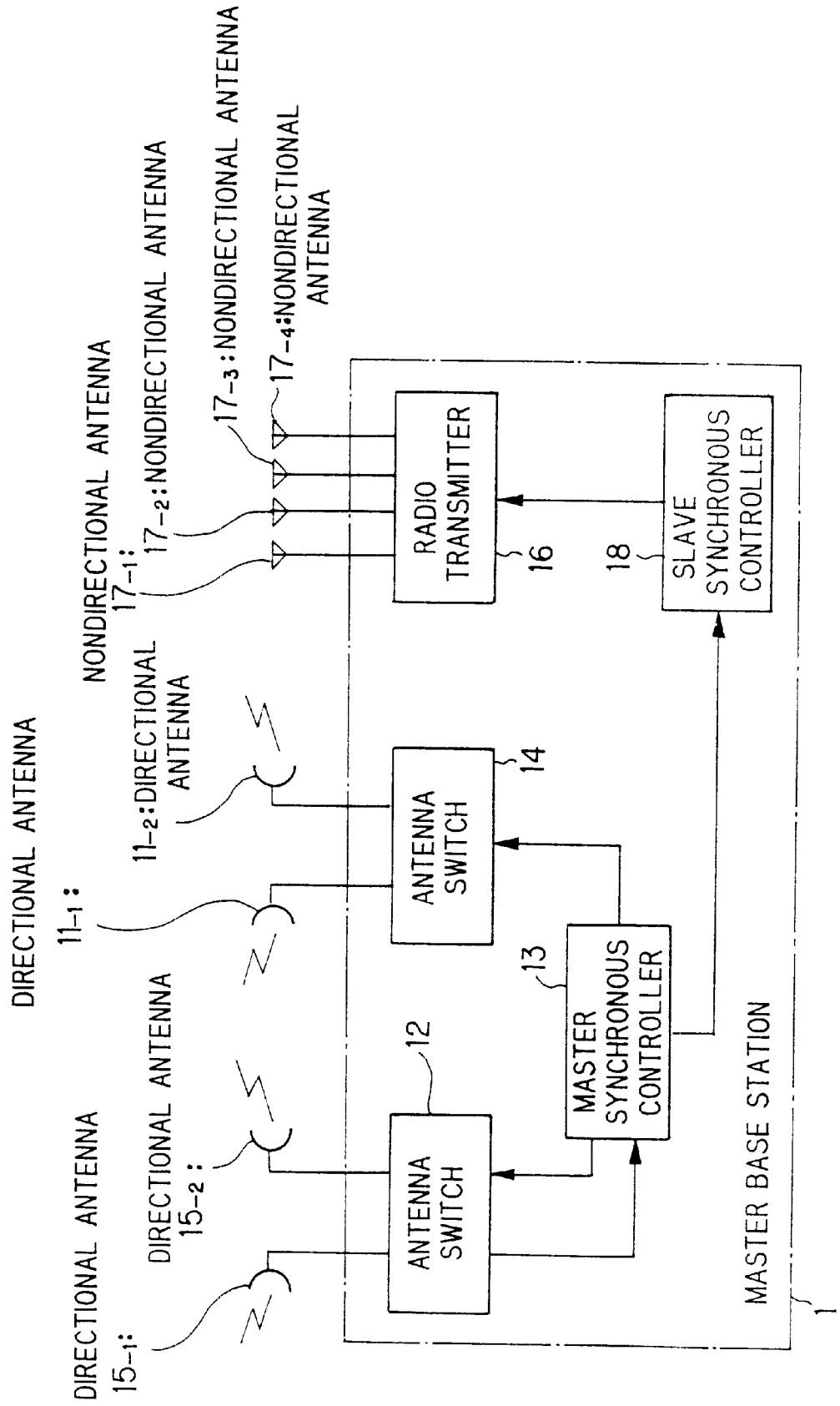
FIG. 3 is a detailed block diagram showing one example of the construction of a master base station in the preferred embodiment of the invention.

FIG. 3 is a detailed block diagram showing one example of the construction of the master base station 1. Numerals $11_{-1}$ and $11_{-2}$ each designate a transmitting directional antenna, and numerals $15_{-1}$ and $15_{-2}$ each a receiving directional antenna. The details of these transmitting directional antennas and receiving directional antennas are the same as those of the directional antennas $31_{-1}$ to $31_{-4}$.

Numerals $17_{-1}$ to $17_{-4}$ each designate nondirectional antennas for use in communication with PS (personal station of PHS). Examples thereof include sleeve antennas. The antennas $17_{-1}$ to $17_{-4}$ are also used for radio synchronization with the slave base station 2.

Numeral 12 designates an antenna switch for switching between the directional antennas $15_{-1}$ and $15_{-2}$, and numeral 14 an antenna switch for switching between the directional antennas $11_{-1}$ and $11_{-2}$. The antenna switches 12 and 14 each comprise a gate circuit or the like.

Thus, the master base station 1 performs switching between the two receiving directional antennas $15_{-1}$, $15_{-2}$ and switching between the two transmitting directional antennas $11_{-1}$, $11_{-2}$ respectively through the antenna switch 12 and the antenna switch 14.

This permits a main path and a bypass to be provided in the synchronous circuit between the master base stations 1. That is, duplexing is provided to improve the reliability of the synchronization.

The master synchronous controller 13 comprises a synchronization generator and a software (both not shown). The timing of the generation of the synchronization is variable by the software. By virtue of this constitution, adjustment can be made to the target timing of the absolute synchronous station 3 and of the mater base station 1.

The slave synchronous controller 18 is a part of the controller used in service, and is synchronized with the master synchronous controller 13. Further, this slave synchronous controller 18 performs diversity control of a radio transmitter 16 to control the gain of the radio transmitter 16.

The synchronous area 4 for each of the master base stations 1 is wider in terms of cell than the cell of each of the slave base stations 2, 2. . . , and, for example, has a radius of about 3.5 km.

Figure 4:
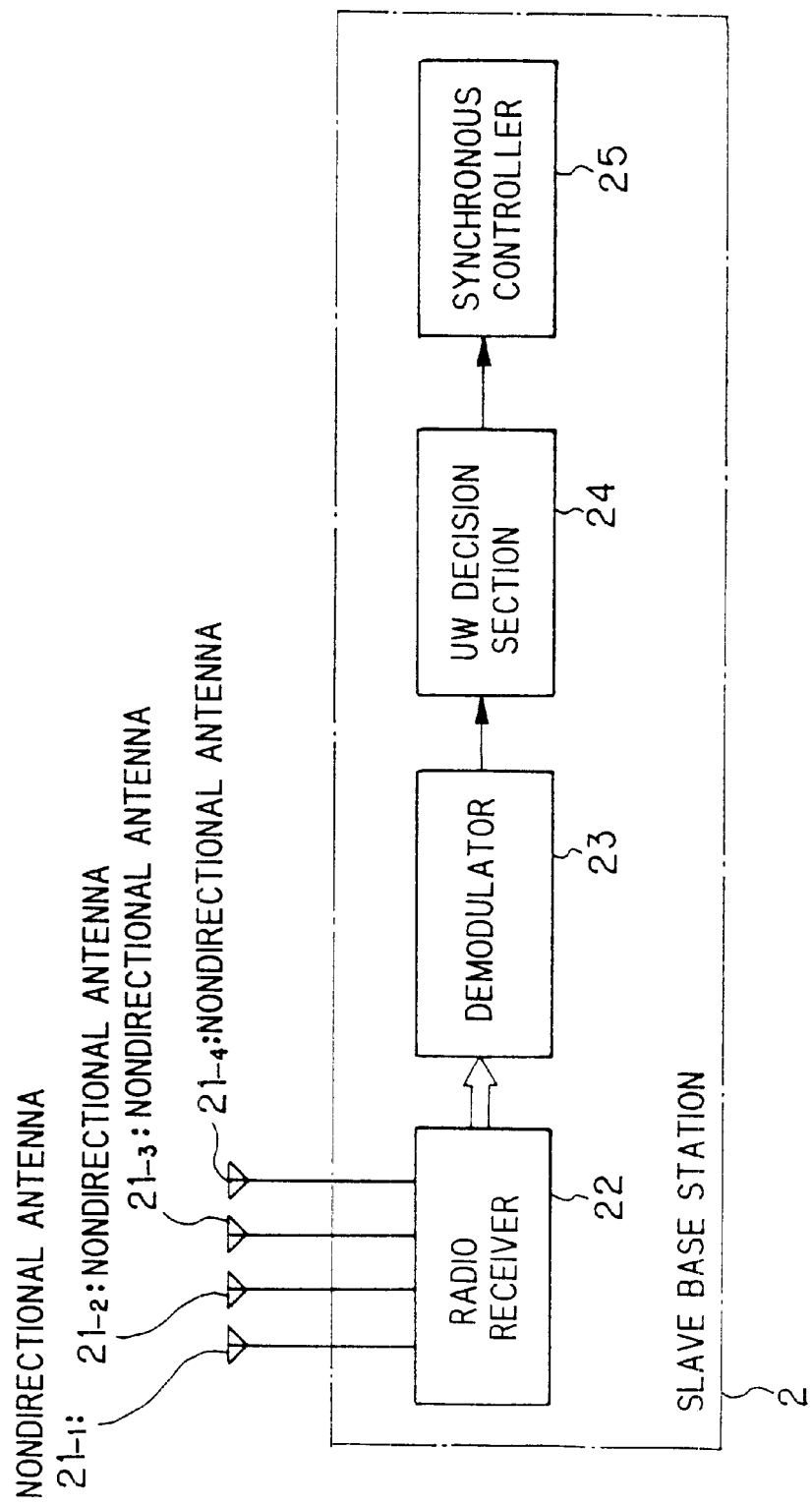
FIG. 4 is a detailed block diagram showing one example of the construction of a slave base station in the preferred embodiment of the invention.

FIG. 4 is a detailed block diagram showing one example of the construction of the slave base station 2. Numerals $21_{-1}$ to $21_{-4}$ each designate a nondirectional antenna of which the details are the same as those of the nondirectional antennas $17_{-1}$ to $17_{-4}$. These nondirectional antennas $21_{-1}$ to $21_{-4}$ perform space diversity.

Numeral 22 designates a radio receiver for a receiving circuit for each of the nondirectional antennas $21_{-1}$ to $21_{-4}$. The radio receiver 22 detects an analog radio signal and converts the analog radio signal to a base band signal. Further, the radio receiver 22 determines a receive level used in a demodulator 23.

The demodulator 23 synthesizes a baseband signal, from each of the nondirectional antennas $21_{-1}$ to $21_{-4}$, received from the radio receiver 22. Thus, demodulation is performed. In the demodulation, the demodulator 23 adds weights for respective nondirectional antennas $21_{-1}$ to $21_{-4}$ depending upon a reference level from the radio receiver 22, to thereby obtain gains. Numeral 24 designates a UW decision section that detects UW (unique word) showing the head of an information field from received data and, based on the position of the head of UW, calculates a deviation of the timing from the master base station 1 as the origin of synchronization.

The information on the deviation in timing calculated in the UW decision section 24 is input into a synchronous controller 25. Based on the information on the deviation in timing, the timing of operation is forcibly adjusted to the timing of the master base station 1 as the origin of synchronization.

Figure 5:
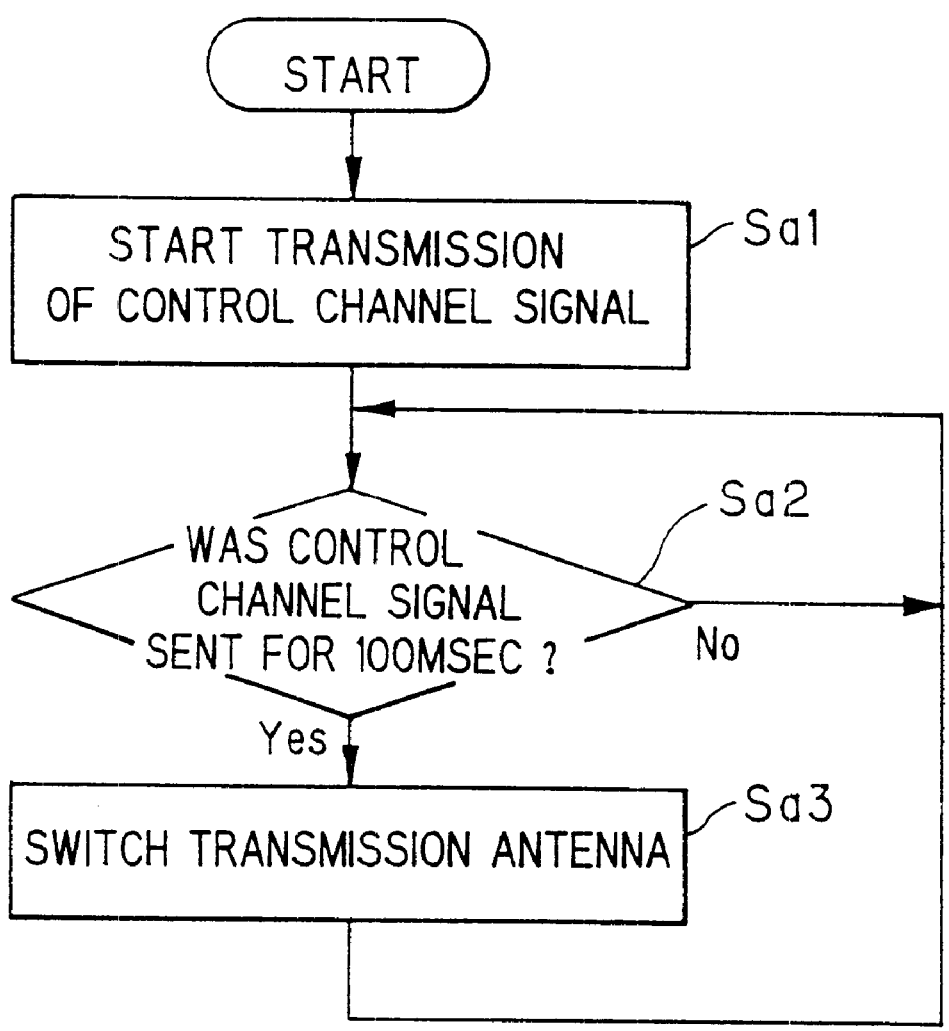
FIG. 5 is a flow chart showing one example of the flow of processing in the absolute synchronous station in the preferred embodiment of the invention.

FIG. 5 is a flow chart showing one example of the flow of processing in the absolute synchronous station 3. In this preferred embodiment, the start-up of the whole system is carried out first in the absolute synchronous station 3, and radio synchronization is performed from a master base station 1 designated by the directional antenna.

Upon the start-up, the absolute synchronous station 3 initiates the transmission of a control channel signal (step Sa1) The directional antennas $31_{-1}$ to $31_{-4}$ are directed to separate respective master base stations 1. Therefore, in the directional antennas $31_{-1}$ to $31_{-4}$, whether or not the control channel signal has been transmitted for 100 msec is successively judged (step Sa2). After 100 msec has elapsed, the transmission antenna (directional antennas $31_{-1}$ to $31_{-4}$) is switched (step Sa3).

In the switching of the directional antennas $31_{-1}$ to $31_{-4}$, a slot counter 34 informs the radio controller 33 of the spacing of 100 msec to control the antenna switch 32. Thus, the control channel signal is successively transmitted from the selected directional antennas $31_{-1}$ to $31_{-4}$.

That is, for each of the directional antennas $31_{-1}$, to $31_{-4}$, the control channel signal is transmitted at spacings of 400 msec.

Figure 6:
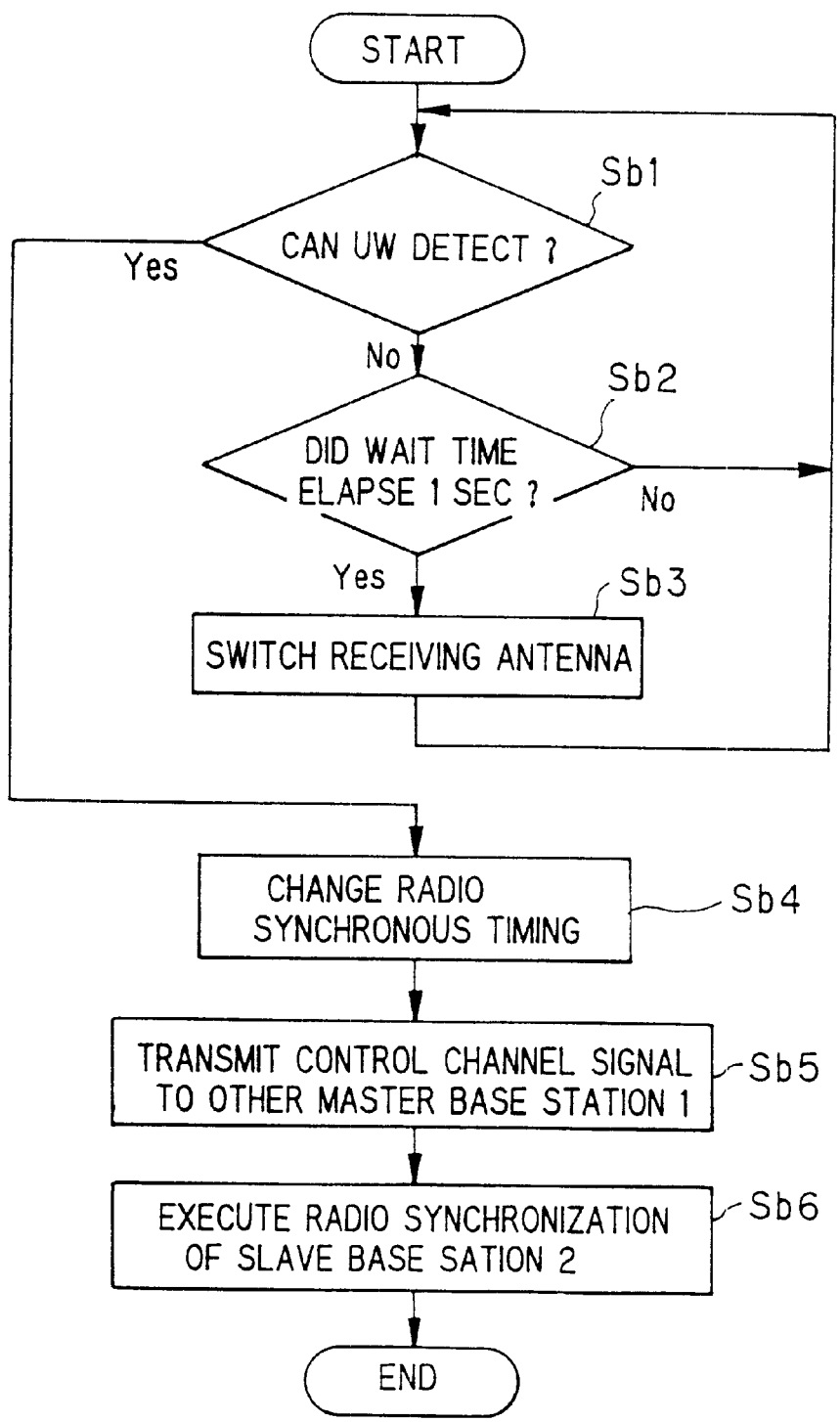
FIG. 6 is a flow chart showing one example of the flow of processing in the master base station in the preferred embodiment of the invention.

FIG. 6 is a flow chart showing one example of the flow of processing in the master base station 1.

The master base station 1 has a directional antenna $15_{-1}$ and a directional antenna $15_{-2}$.

Accordingly, any one of the directional antennas $15_{-1}$ and $15_{-2}$ waits for a control channel signal from the absolute synchronous station 3 or the other master base stations 1, and monitoring is carried out on whether or not UW can be detected (step Sb1).

Further, monitoring is carried out on whether or not the wait time in the directional antenna exceeded one sec (step Sb2). As soon as one sec has elapsed, the receiving antenna is switched (step Sb3) to wait for the control channel signal.

When UW could be detected in step Sb1, the timing of the radio synchronization is varied based on the detected UW (step Sb4).

Figure 7A:
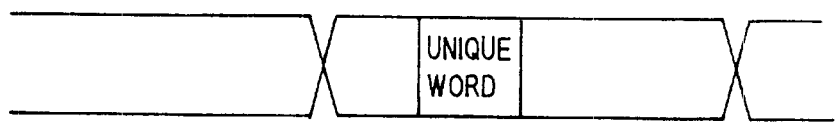
FIGS. 7A to 7D are diagrams showing the state of a control channel signal in the preferred embodiment of the invention.

FIGS. 7A to 7D are diagrams showing the state of the control channel signal. Specifically, FIG. 7A shows a control channel signal in any one of the master base stations 1, FIG. 7B a received control channel signal, FIG. 7C a control channel signal after timing correction, and FIG. 7D a deviation in timing attributable to distance.

Figure 7B:
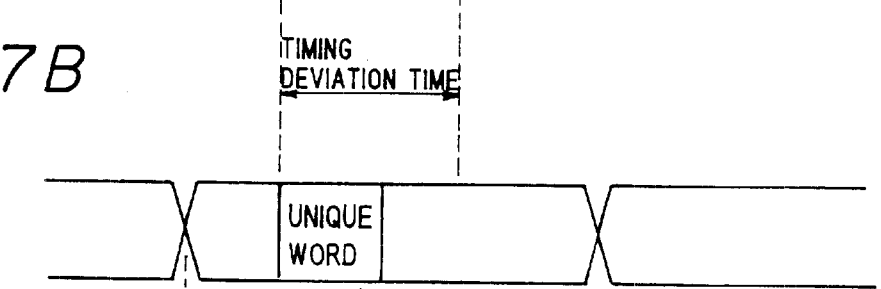
Figure 7C:
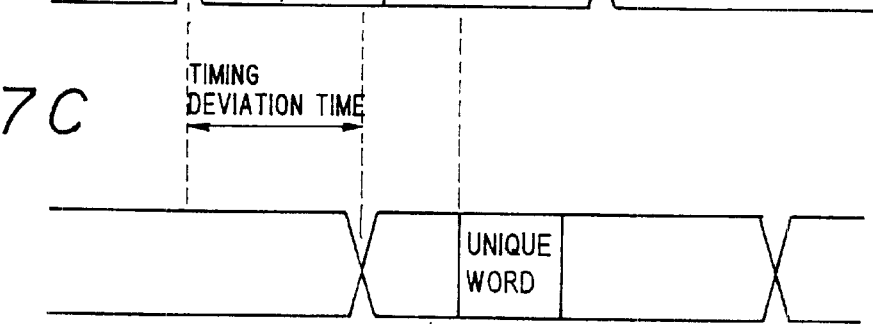

More specifically, timing deviation time A is determined based on the signal shown in FIG. 7A and the signal FIG. 7B. Therefore, as shown in FIG. 7C, synchronous timing is forcibly shifted by time A.

Figure 7D:
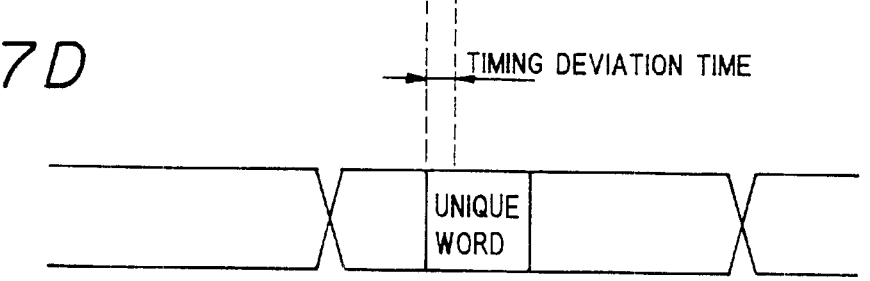

The deviation in timing attributable to distance also occurs. In this case, since the distance between the absolute synchronous station 3 and each of the master synchronous stations 1 is known, timing deviation time B can be predetermined. Therefore, as shown in FIG. 7D, also for time B, the timing may be shifted by time B.

Thus, the master base station 1 of which the synchronization has been established, after the correction of synchronization, transmits a control channel signal to the other master base stations 1 at spacings of 100 msec alternately from the directional antenna $11_{-1}$ and the directional antenna $11_{-2}$ (step Sb5)

Further, thereafter, the master base stations 1 are synchronized one by one, and synchronization among the master base stations 1 in the whole service area is carried out.

The slave base stations 2 wait from the start-up of this preferred embodiment for the completion of the synchronization of all the master base stations 1, and, upon the completion of the synchronization, execute radio synchronization (step Sb6).

In this case, the master base station 1 is detected which exhibits the highest receive level, followed by radio synchronization. The procedure for the correction of synchronization timing is the same as described above.

As described above, according to the preferred embodiment of the invention, in a mobile communication system comprising: a plurality of first base stations each having a predetermined radio zone, for performing communication with one or more mobile stations; a plurality of second base stations each having a predetermined radio zone and each having a predetermined synchronous area, for performing communication with one or more mobile stations and, in addition, giving a synchronous standard to the plurality of first base stations with the radio zones being in contact with or overlapped with each other within the synchronous area; and an absolute synchronous station for giving a synchronous standard to each of the plurality of second base stations, the second base stations each control the timing of a control channel signal transmitted to other second base station based on the timing of a control channel signal transmitted by the absolute synchronous station. Further, the second base stations each control the timing of a control channel signal transmitted to the mobile station based on the timing of a control channel signal transmitted by the absolute synchronous station. The second base stations each control the timing of a control channel signal transmitted to the mobile station based on the timing of a control channel signal transmitted by the other second base station. The control channel signal has a predetermined fixed code at a predetermined position of all bits, and the second base stations each delay the control channel signal to be transmitted so that the bit position of the predetermined fixed code contained in the control channel signal transmitted is consistent with the bit position of the predetermined fixed code contained in the received control channel signal. Therefore, it is possible realize a mobile communication system and a method for establishing synchronization in mobile communications that can ensure synchronization between a plurality of base stations and can enhance frequency reuse in time division transmission without increasing the occurrence of interference.

That is, a selected base station covering the whole area is first subjected to radio synchronization, followed by simultaneous synchronization of the other base stations used in service. This can shorten the time taken for the synchronization of the whole area to be established.

Further, only the wait time for synchronization of the master base station is required, and the operational base stations can be simultaneously synchronized. This can realize simplification of algorithm.

Furthermore, radio synchronization by the device within the self-system is possible. Therefore, there is no need to rely upon other systems.

The invention has been described in detail with particular reference to preferred embodiments, but it will be understood that variations and modifications can be effected within the scope of the invention as set forth in the appended claims.

What is claimed is:

1. A mobile communication system comprising:
   a plurality of first base stations each having a predetermined radio zone, for performing communication with one or more mobile stations;
   a plurality of second base stations each having a predetermined radio zone, for performing communication with one or more mobile stations and, in addition, giving a synchronous standard to said plurality of first base stations; and
   an absolute synchronous station for giving a synchronous standard to each of the plurality of second base stations.

2. The mobile communication system according to claim 1, wherein:
   the plurality of second base stations each have a predetermined synchronous area and
   a plurality of the first base stations with the radio zones being in contact with or overlapped with each other are present within the synchronous area.

3. The mobile communication system according to claim 1, wherein:
   the second base stations each have first timing control means for controlling the timing of a control channel signal transmitted to at least one other second base station based on the timing of a control channel signal transmitted by the absolute synchronous station.

4. The mobile communication system according to claim 2, wherein:
   the second base stations each have first timing control means for controlling the timing of a control channel signal transmitted to at least one other second base station based on the timing of a control channel signal transmitted by the absolute synchronous station.

5. The mobile communication system according to claim 1, wherein:
   the second base stations each have a timing control means for controlling the timing of a control channel signal transmitted to at least one mobile station based on the timing of a control channel signal transmitted by the absolute synchronous station.

6. The mobile communication system according to claim 2, wherein:
   the second base stations each have a timing control means for controlling the timing of a control channel signal transmitted to at least one mobile station based on the timing of a control channel signal transmitted by the absolute synchronous station.

7. The mobile communication system according to claim 3, wherein:
   the second base stations each have second timing control means for controlling the timing of a control channel signal transmitted to at least one mobile station based on the timing of a control channel signal transmitted by the absolute synchronous station.

8. The mobile communication system according to claim 4, wherein:
   the second base stations each have second timing control means for controlling the timing of a control channel signal transmitted to at least one mobile station based on the timing of a control channel signal transmitted by the absolute synchronous station.

9. The mobile communication system according to claim 1, wherein:
   the second base stations each have a timing control means for controlling the timing of a control channel signal transmitted to at least one mobile station based on the timing of a control channel signal transmitted by at least one other second base station.

10. The mobile communication system according to claim 2, wherein:
    the second base stations each have a timing control means for controlling the timing of a control channel signal transmitted to at least one mobile station based on the timing of a control channel signal transmitted by at least one other second base station.

11. The mobile communication system according to claim 3, wherein:
    the second base stations each have second timing control means for controlling the timing of a control channel signal transmitted to at least one mobile station based on the timing of a control channel signal transmitted by at least one other second base station.

12. The mobile communication system according to claim 4, wherein:
    the second base stations each have second timing control means for controlling the timing of a control channel signal transmitted to at least one mobile station based on the timing of a control channel signal transmitted by at least one other second base station.

13. The mobile communication system according to claim 5, wherein:
    the control channel signal has a predetermined fixed code at a predetermined position of all bits, and
    the second base stations each delay the control channel signal to be transmitted so that the bit position of the predetermined fixed code contained in the control channel signal transmitted is consistent with the bit position of the predetermined fixed code contained in the received control channel signal.

14. The mobile communication system according to claim 6, wherein:
    the control channel signal has a predetermined fixed code at a predetermined position of all bits, and
    the second base stations each delay the control channel signal to be transmitted so that the bit position of the predetermined fixed code contained in the control channel signal transmitted is consistent with the bit position of the predetermined fixed code contained in the received control channel signal.

15. The mobile communication system according to claim 7, wherein:
    the control channel signal has a predetermined fixed code at a predetermined position of all bits, and
    the second base stations each delay the control channel signal to be transmitted so that the bit position of the predetermined fixed code contained in the control channel signal transmitted is consistent with the bit position of the predetermined fixed code contained in the received control channel signal.

16. The mobile communication system according to claim 8, wherein:
    the control channel signal has a predetermined fixed code at a predetermined position of all bits, and
    the second base stations each delay the control channel signal to be transmitted so that the bit position of the predetermined fixed code contained in the control channel signal transmitted is consistent with the bit position of the predetermined fixed code contained in the received control channel signal.

17. The mobile communication system according to claim 9, wherein:

the control channel signal has a predetermined fixed code at a predetermined position of all bits, and the second base stations each delay the control channel signal to be transmitted so that the bit position of the predetermined fixed code contained in the control channel signal transmitted is consistent with the bit position of the predetermined fixed code contained in the received control channel signal.

18. The mobile communication system according to claim 10, wherein:

the control channel signal has a predetermined fixed code at a predetermined position of all bits, and the second base stations each delay the control channel signal to be transmitted so that the bit position of the predetermined fixed code contained in the control channel signal transmitted is consistent with the bit position of the predetermined fixed code contained in the received control channel signal.

19. The mobile communication system according to claim 11, wherein:

the control channel signal has a predetermined fixed code at a predetermined position of all bits, and the second base stations each delay the control channel signal to be transmitted so that the bit position of the predetermined fixed code contained in the control channel signal transmitted is consistent with the bit position of the predetermined fixed code contained in the received control channel signal.

20. The mobile communication system according to claim 12, wherein:

the control channel signal has a predetermined fixed code at a predetermined position of all bits, and the second base stations each delay the control channel signal to be transmitted so that the bit position of the predetermined fixed code contained in the control channel signal transmitted is consistent with the bit position of the predetermined fixed code contained in the received control channel signal.

21. A method for establishing synchronization in mobile communication, comprising the steps of:

providing a mobile communication system comprising
a plurality of first base stations each having a predetermined radio zone, for performing communication with one or more mobile stations,
a plurality of second base stations each having a predetermined radio zone and each having a predetermined synchronous area, for performing communication with one or more mobile stations and, in addition, giving a synchronous standard to the plurality of first base stations with the radio zones being in contact with or overlapped with each other within the synchronous area, and
an absolute synchronous station for giving a synchronous standard to each of the plurality of second base stations; and
through each of the second base stations, controlling the timing of a control channel signal transmitted to the other second base stations based on the timing of a control channel signal transmitted by the absolute synchronous station.

22. The method for establishing synchronization in mobile communication according to claim 21, wherein:

the second base stations each control the timing of a control channel transmitted to at least one mobile station based on the timing of a control channel signal transmitted by the absolute synchronous station.

23. The method for establishing synchronization in mobile communication according to claim 21, wherein:

the second base stations each control the timing of a control channel signal transmitted to at least one mobile station based on the timing of a control channel signal transmitted by at least one other second base station.

24. The method for establishing synchronization in mobile communication according to claim 22, wherein:

the control channel signal has a predetermined fixed code at a predetermined position of all bits, and the second base stations each delay the control channel signal to be transmitted so that the bit position of the predetermined fixed code contained in the control channel signal transmitted is consistent with the bit position of the predetermined fixed code contained in the received control channel signal.

25. The method for establishing synchronization in mobile communication according to claim 23, wherein:

the control channel signal has a predetermined fixed code at a predetermined position of all bits, and the second base stations each delay the control channel signal to be transmitted so that the bit position of the predetermined fixed code contained in the control channel signal transmitted is consistent with the bit position of the predetermined fixed code contained in the received control channel signal.

* * * * *